Patented Nov. 8, 1927.

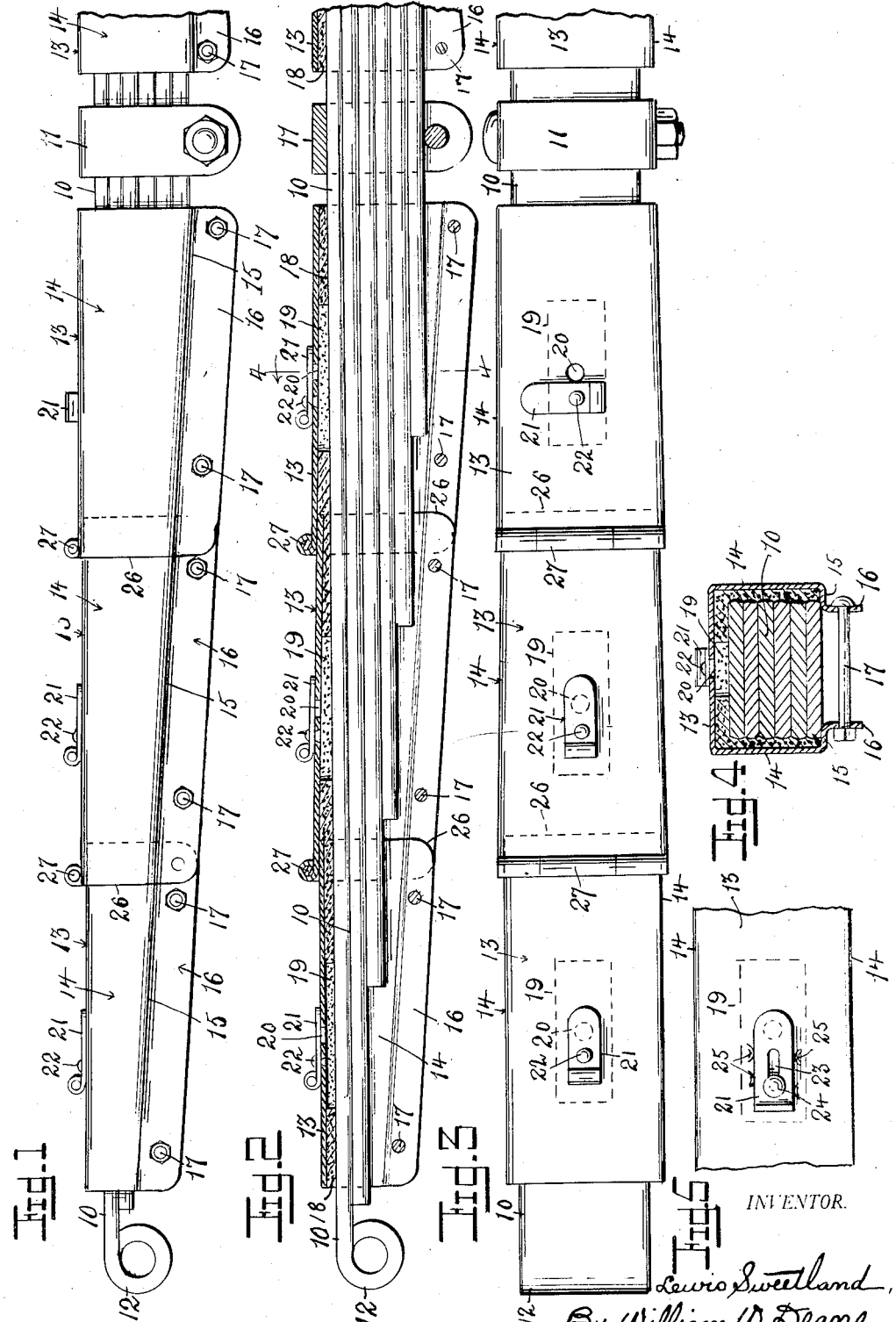
Nov. 8, 1927. 1,648,702
L. SWEETLAND
ATTACHMENT TO LEAF SPRINGS FOR LUBRICATING SAME
Original Filed May 29, 1925

1,648,702

UNITED STATES PATENT OFFICE.

LEWIS SWEETLAND, OF CORUNNA, MICHIGAN.

ATTACHMENT TO LEAF SPRINGS FOR LUBRICATING SAME.

Application filed May 29, 1925, Serial No. 33,701. Renewed April 13, 1927.

This invention relates to attachments to leaf springs for the purpose of constantly applying lubricant thereto, and has for one of its objects to simplify and improve the construction and increase the utility and efficiency of devices of this character.

Another object of the invention is to provide a device of this character which may be applied without material structural change to springs of various sizes and forms.

Another object of the invention is to produce a device of this character formed of a plurality of sections hingedly united to provide the necessary yieldableness to adapt the device to the change of form caused by the flexing of the leaves of the spring under pressure or weight.

Another object of the invention is to provide a device of this character capable of being folded into a relatively small space for shipment or storage.

Another object of the invention is to provide a device of this character constituting a shield or guard for a lubricant holding and imparting element, such as felt or the like.

With these and other objects in view the invention consists in certain novel features of construction as hereinafter shown and described, and then specifically pointed out in the claims, and in the drawings illustrative of the preferred embodiment of the invention;

Figure 1 is a side elevation of a part of a conventional leaf spring, with the improved attachment applied thereto and in side elevation.

Figure 2 is a like view with improved attachment in longitudinal section.

Figure 3 is a plan view of the parts shown in Fig. 1.

Figure 4 is a transverse section on the line 4—4 of Fig. 2, looking in the direction of the arrow.

Figure 5 is a detail illustrating a modification in the construction.

In the drawings corresponding parts are denoted by the same reference characters in all the figures.

The improved device is more particularly applicable to the springs of motor driven vehicles, but it is not desired to limit the invention to the springs of any particular structure or vehicle, but for the purpose of illustration is shown applied to a part of a conventional leaf spring in which 10 indicates the leaves, 11 the centre clips and 12 the terminal eye or loop by which the spring is coupled to the supporting link or shackle.

The improved attachment comprises a sheet metal shield in one or more sections, and hingedly united when two or more are employed, and enclosing the top, sides and a portion of the bottom of the spring and arranged to be clamped in place by a plurality of transverse bolts. A layer of felt or other lubricant absorbing and conveying material is interposed between the shield members and the top and sides of the spring members, with cavities in the absorbent material at intervals, and an orifice through the shield material communicating with each of the cavities, to enable the lubricant to be supplied to the absorbent material.

Each orifice is arranged to be closed by a movable cover, to exclude dust and the like, and also to prevent the escape of the lubricant through the orifices.

For the purpose of illustration three of the sheet metal shield sections are shown, but this number may be increased or decreased as required, to conform to the length of the spring.

Each of the sheet metal sections comprises a top or upper portion 13, side portions 14, the lower part of each side portion being directed inwardly beneath the spring members as shown at 15, and thence directed downwardly to form flanges as shown at 16, the flanges being apertured to receive clamp bolts 17, by which the sections are firmly clamped in place upon the spring members.

Disposed between the top 13 and sides 14 of the shield members, is a layer of an absorbent material for the lubricant such as felt or the like, and indicated as a whole at 18, the latter extending full length of the shield members.

Formed through the upper portion of the felt material, or the part next to the top portions 13 of the shield members are cavities 19, and formed through the top 13 of each shield member and communicating with the cavities is an orifice 20, to provide means for supplying the lubricant to the absorbent material, and to replenish the lubricant as often as required.

Each of the orifices is provided with a closure 21 movably arranged in any suitable manner, either to swing on a pin 22 as shown in Figs. 1, 2, 3 and 4, or slotted as shown at 23 in Fig. 5, and slidable on a pin 24 between stops 25.

By this arrangement the springs may be easily and conveniently supplied with a lubricant, and the latter effectually uniformly and constantly supplied, and prevented from seeping out and dripping.

The shield members overlap as shown at 26, and are hingedly united as shown at 27, to provide the necessary flexibility when the springs are flexed under a load.

When not in use or when being transported or stored, the hingedly united sections may be folded into a relatively small space, as will be obvious.

The improved device is simple in construction, can be inexpensively manufactured and of any required size to adapt it to various sizes and forms of springs.

What I claim and desire to secure by Letters-Patent is:

1. An attachment of the class described comprising a shield formed of a plurality of sections and conforming to one face and the sides of a spring with the side portions inturned to engage the other face of the spring, each shield section having an orifice through one portion, an absorbent element enclosed by the shield and having lubricant receiving cavities therein with which the orifices communicate, and clamping means applied to said inturned portions to clamp the shield to the spring and press the absorbent element thereon.

2. An attachment of the class described comprising a shield formed of a plurality of sections, each section conforming to one face and the sides of a spring with the side portions inturned to engage the other face of the spring, an absorbent element enclosed by the shield, means hingedly connecting the portions of the sections overlying the top face of the spring, and clamping means applied to said inturned portions to clamp the shield to the spring and press the absorbent element thereon.

In testimony whereof I affix my signature.

LEWIS SWEETLAND.